United States Patent
Gassner et al.

(10) Patent No.: US 12,461,824 B1
(45) Date of Patent: Nov. 4, 2025

(54) SYSTEM AND METHOD FOR MANAGING SANDBOX IN ENTERPRISE CONTENT MANAGEMENT

(71) Applicant: Veeva Systems Inc., Pleasanton, CA (US)

(72) Inventors: Peter Gassner, Pleasanton, CA (US); Andrew Han, Needham, MA (US); Kunal Morparia, Fremont, CA (US)

(73) Assignee: Veeva Systems Inc., Pleasanton, CA (US)

( * ) Notice: Subject to any disclaimer, the term of this patent is extended or adjusted under 35 U.S.C. 154(b) by 128 days.

(21) Appl. No.: 18/305,177

(22) Filed: Apr. 21, 2023

(51) Int. Cl.
*G06F 11/00* (2006.01)
*G06F 11/14* (2006.01)
*G06F 21/60* (2013.01)

(52) U.S. Cl.
CPC ...... *G06F 11/1451* (2013.01); *G06F 11/1435* (2013.01); *G06F 21/602* (2013.01)

(58) Field of Classification Search
None
See application file for complete search history.

(56) References Cited

U.S. PATENT DOCUMENTS

| | | |
|---|---|---|
| 2017/0052879 A1* | 2/2017 | Chandra ............. G06F 11/3664 |
| 2018/0373604 A1* | 12/2018 | Martin ................ G06F 11/1451 |
| 2020/0201745 A1* | 6/2020 | Martin ..................... G06F 16/21 |
| 2020/0250325 A1* | 8/2020 | Chong ............... G06F 21/6218 |
| 2024/0362120 A1* | 10/2024 | Vered ................... G06F 16/125 |

OTHER PUBLICATIONS

Google Scholar/Patents search—text refined (Year: 2024).*
Google Scholar/Patents search—text refined (Year: 2025).*

* cited by examiner

*Primary Examiner* — Christopher S McCarthy (57) ABSTRACT

Systems and methods for managing sandboxes in content management systems. A sandbox snapshot may be taken at a given point of time, which is a file for storing configuration and data of the sandbox. The configuration and data stored in a sandbox snapshot may allow users to reuse the configuration and data across test runs, refresh or create sandboxes, or reset the sandbox to a known state.

15 Claims, 8 Drawing Sheets

Sandbox Snapshots

| Name | Description | Source Sandbox | Status | Creator | Create Time |
|---|---|---|---|---|---|
| Snapshot 111s1 | | Sandbox 111s0 | Active | John Smith | 20230301 4pm |

Update
Create a sandbox
Reset
Delete

FIG. 7

SYSTEM AND METHOD FOR MANAGING SANDBOX IN ENTERPRISE CONTENT MANAGEMENT

BACKGROUND

The subject technology relates generally to content management, and more particularly to managing sandboxes in enterprise content management systems.

Content management systems are becoming increasingly popular among users due to their ease of access and availability from anywhere, at any time, and on any device. To meet the needs of these users, new features are regularly added and tested within the content management system environment. Sandboxes could be used in these systems for testing and development purposes, providing developers with a controlled and isolated environment to test software and code changes without impacting the production system in a content management system. With sandbox testing, developers can experiment with different configurations, make necessary changes, and ensure high-quality, reliable services for users without the risk of causing any damage to the production system.

SUMMARY

The disclosed subject matter relates to a method for managing one or more sandboxes in a content management system, wherein the content management system comprises a first production repository, and a sandbox controller. The method comprises: establishing an access protocol for the production repository, wherein content is stored in the production repository according to the access protocol, and wherein the product repository is in a production domain of the content management system. The method comprises: creating a first sandbox by the sandbox controller in the content management system, wherein the first sandbox is in a sandbox domain of the content management system, and wherein the sandbox domain is segregated from the production domain of the content management system. The method comprises: creating a first snapshot of the first sandbox at a first time by the sandbox controller, wherein the first snapshot comprises information of the first sandbox at the first time. The method comprises: storing the first snapshot of the first sandbox in the sandbox domain of the content management system together with attributes of the first snapshot of the first sandbox, wherein the attributes of the first snapshot of the first sandbox comprise a name, description, and identification information of the first sandbox. The method comprises: resetting the first sandbox to its status at the first time by the sandbox controller with the first snapshot of the first sandbox taken at the first time by applying the information of the first sandbox at the first time in the first snapshot of the first sandbox.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for managing sandboxes in content management systems. A sandbox snapshot may be taken at a given point of time, which is a file for storing configuration and data of the sandbox. The configuration and data stored in a sandbox snapshot may allow users to reuse the configuration and data across test runs, refresh or create sandboxes, or reset the sandbox to a known state.

Figure 1:
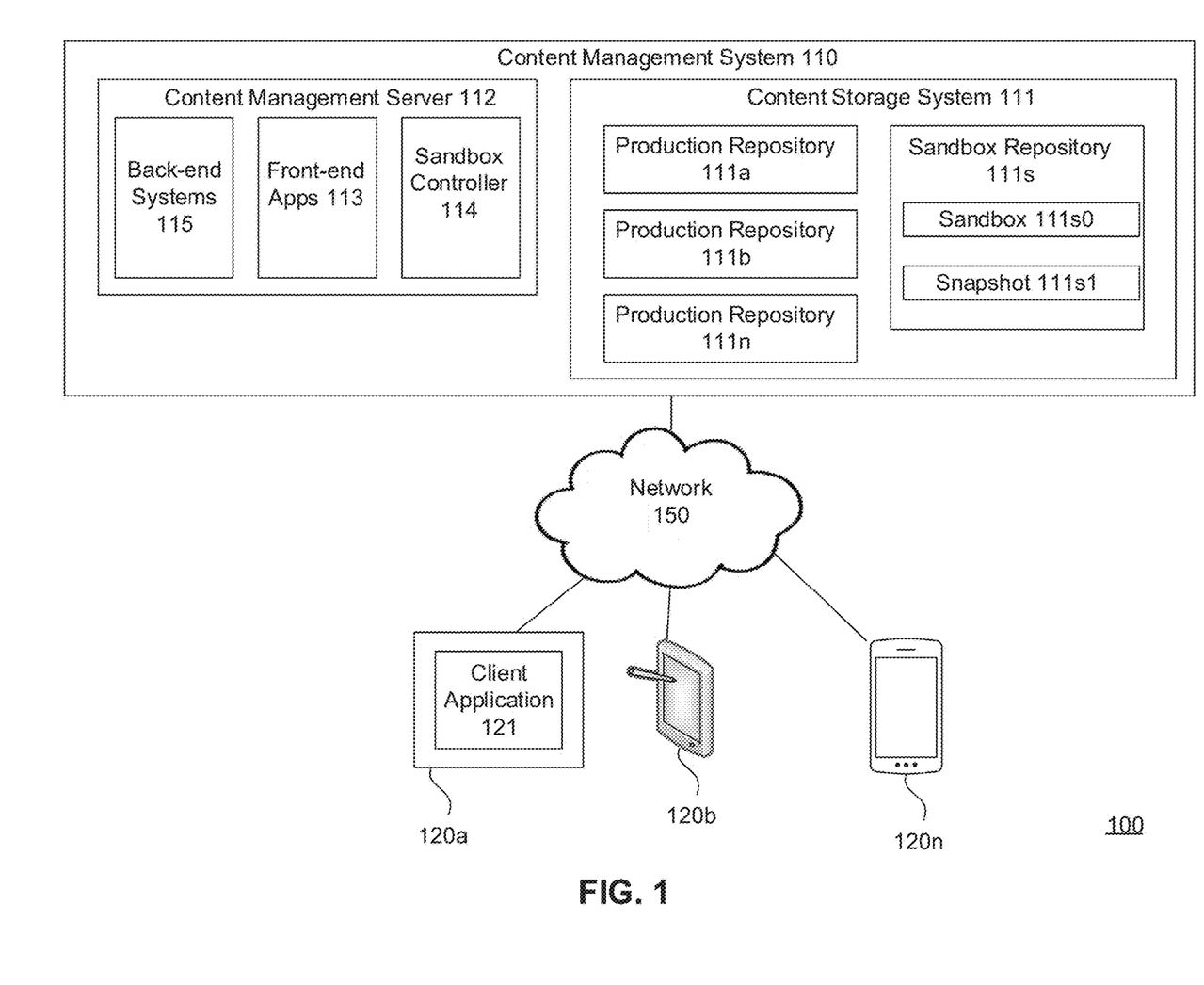
FIG. 1 illustrates an example high level block diagram of an enterprise content management architecture wherein the present invention may be implemented.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120a, 120b, ... 120n, coupled to each other via a network 150. The content management system 110 may include a content storage system 111 and a content management server 112. The content storage system 111 may have two or more production repositories, e.g., 111a, 111b ... and 111n, and at least one sandbox repository 111s. A production repository, e.g., 111a, is in a production domain, and the sandbox repository 111s is in a sandbox domain. The production domain and the sandbox domain are segregated from each other. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access content in the content management system 110 via the network 150. User computing devices 120a-120n are illustrated in more detail in FIG. 4.

The content storage system 111 may store content that client applications (e.g., 121) in user computing devices 120a-120n may access and may be any commercially available storage devices. As will be described with reference to FIG. 2 below, each production repository (e.g., 111a, 111b or 111n) may store a specific category of content, be the source repository for its content, and allow users to interact with its content in a specific business context. An access protocol is established for the production repositories, and content is stored in the production repositories according to the access protocol.

The content management server 112 is typically a remote computer system accessible over a remote or local network, such as the network 150. The content management server 112 could be any commercially available computing devices. A client application (e.g., 121) process may be active on one or more user computing devices 120a-120n. The corresponding server process may be active on the content management server 112, as one of the front-end applications 113 described with reference to FIG. 2. The client application process and the corresponding server process may communicate with each other over the network 150, thus providing distributed functionality and allowing multiple client applications to take advantage of the information-gathering capabilities of the content management system 110.

In one implementation, the content management server 112 may include a sandbox controller 114 which may control the process for testing software in the sandbox 111s0 and processing snapshots of the sandbox 111s0, as will be described with reference to FIGS. 6A, 6B and 7 below.

Although the front-end applications 113, the back-end systems 115 and the document classification controller 114 are shown in one server, it should be understood that they may be implemented in multiple computing devices.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
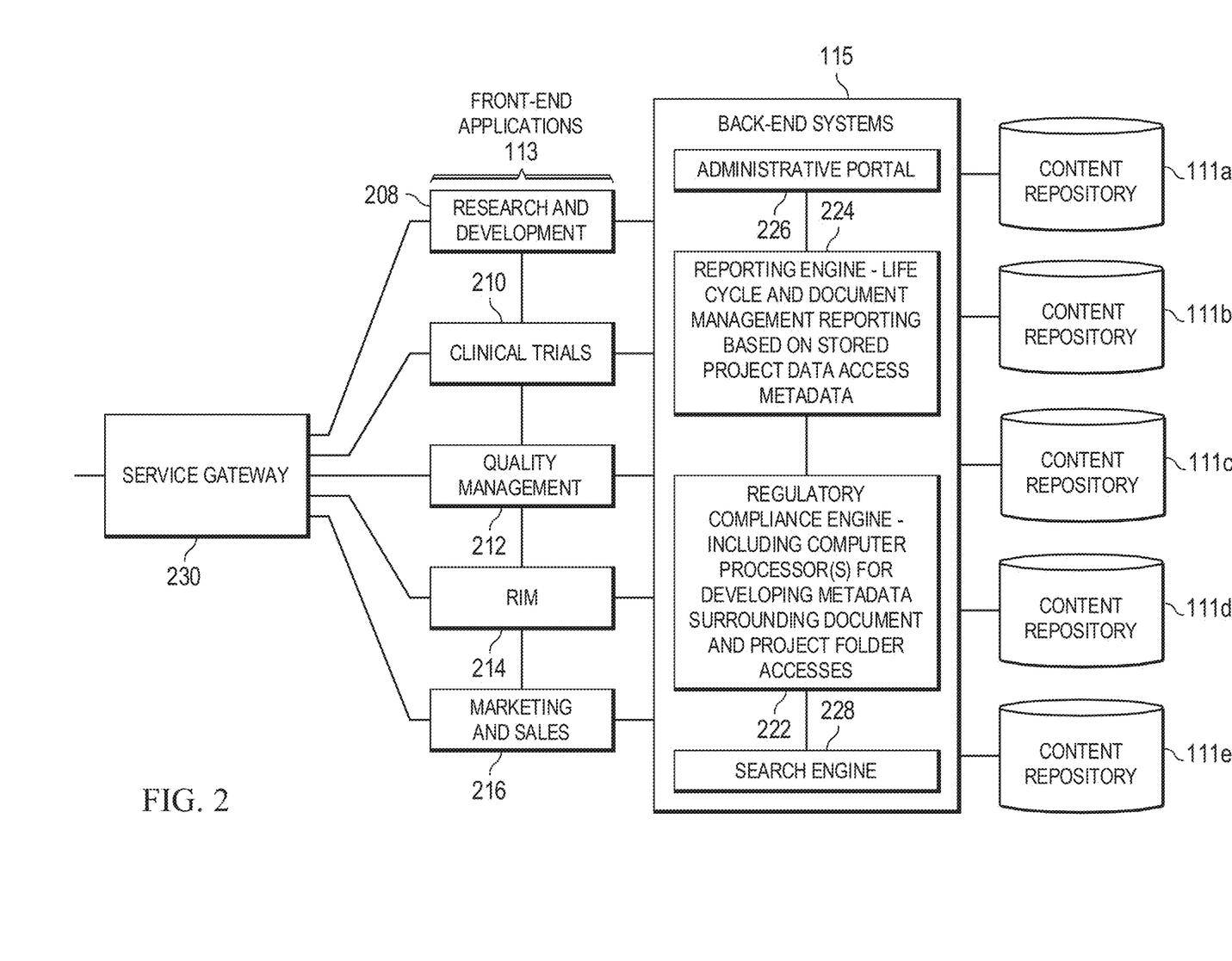
FIG. 2 provides a description of the content management system with additional specific applications and interfaces connected thereto.

FIG. 2 provides a description of the content storage system 111 with additional specific applications and interfaces connected thereto. In an embodiment, this content storage system 111 is a cloud-based or distributed network based system for consolidating an enterprise's data, oftentimes integrating multiple content repositories in an enterprise into a single system having coordinated control, measuring, and auditing of data creation, access and distribution.

In an embodiment of the content storage system 111 for the life sciences industry, as illustrated in the figure, this content storage system 111 can include specific data collections for the following areas and/or business process-specific front-end applications 113:

The Research & Development (R&D) front-end application 208 provides for an aggregation of materials in support of research and initial clinical trial submissions through building organized and controlled content repositories within the content management system 110, more specifically, the content repository 111a. Elements that can be stored, organized, and managed through this front-end include submission bills of materials, Drug Information Association (DIA) reference models support, and submission-ready renderings. This front-end 208 is designed to provide an interface to the content management system 110 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the content management system 110 further provides for efficient passing off of content, e.g., in the content repository 111b, between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the content management system 110, or more specifically, the content repository 111c, whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the content management system 110. Related documents may be stored in the content repository 111d.

The marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the content management system 110, and the promotional materials may be stored in the content repository 111e.

In disclosed embodiments, there are provided a number of back-end system applications 115 that provide for the management of the data, forms, and other communications in the content management system 110. For example, the back-end systems applications 115 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

In further disclosed embodiments, the back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the content management system 110.

In further disclosed embodiments, the back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 115 may include a search engine 228 whereby the content management system 110 can deliver simple, relevant and secure searching.

The content management system 110 may have more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back end systems 115, enabling seamless integration among complementary systems.

In the context of the described embodiments, content in one repository, e.g., the content repository 111a for the Research & Development (R&D) front-end application 208, may be re-used in another repository (e.g., the content repository 111d) with another front-end application (e.g., the medical communications application 214).

The content management system 110 may store content for other industries.

Figure 3:
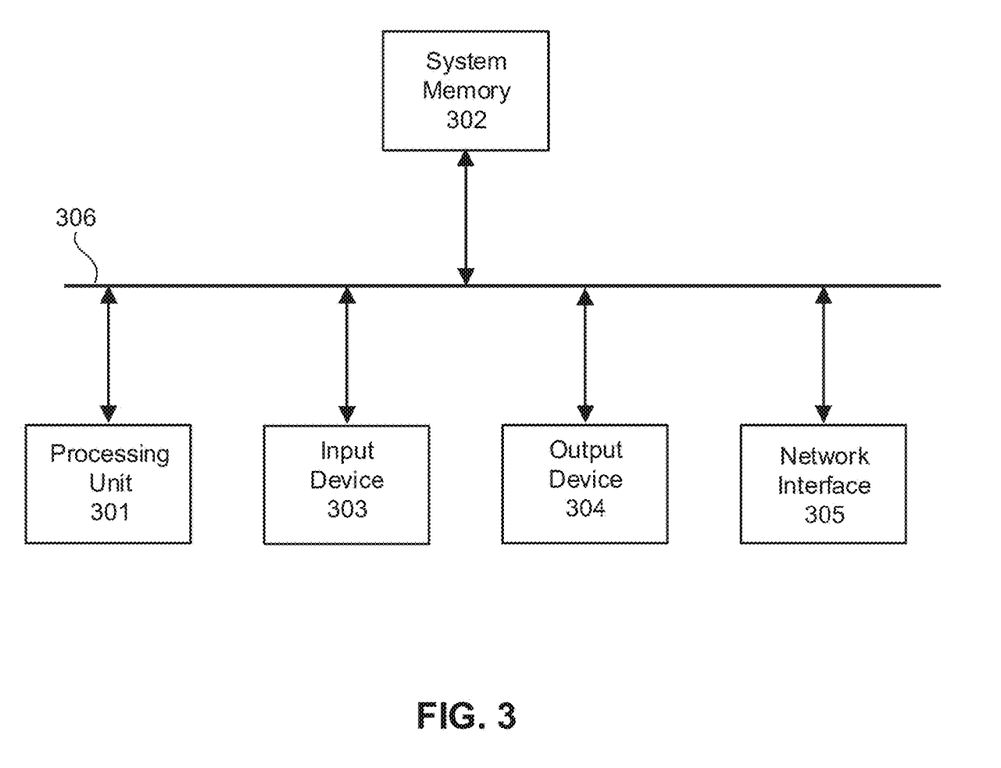
FIG. 3 illustrates an example block diagram of a computing device.

FIG. 3 illustrates an example block diagram of a computing device 300 which can be used as the user computing devices 120a-120n, and the content management server 112 in FIG. 1. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may be configured to allow the computing device 300 to transmit and receive data in a network, for example, the network 150. The network interface 305 may include one or more network interface cards (NICs).

Figure 4:
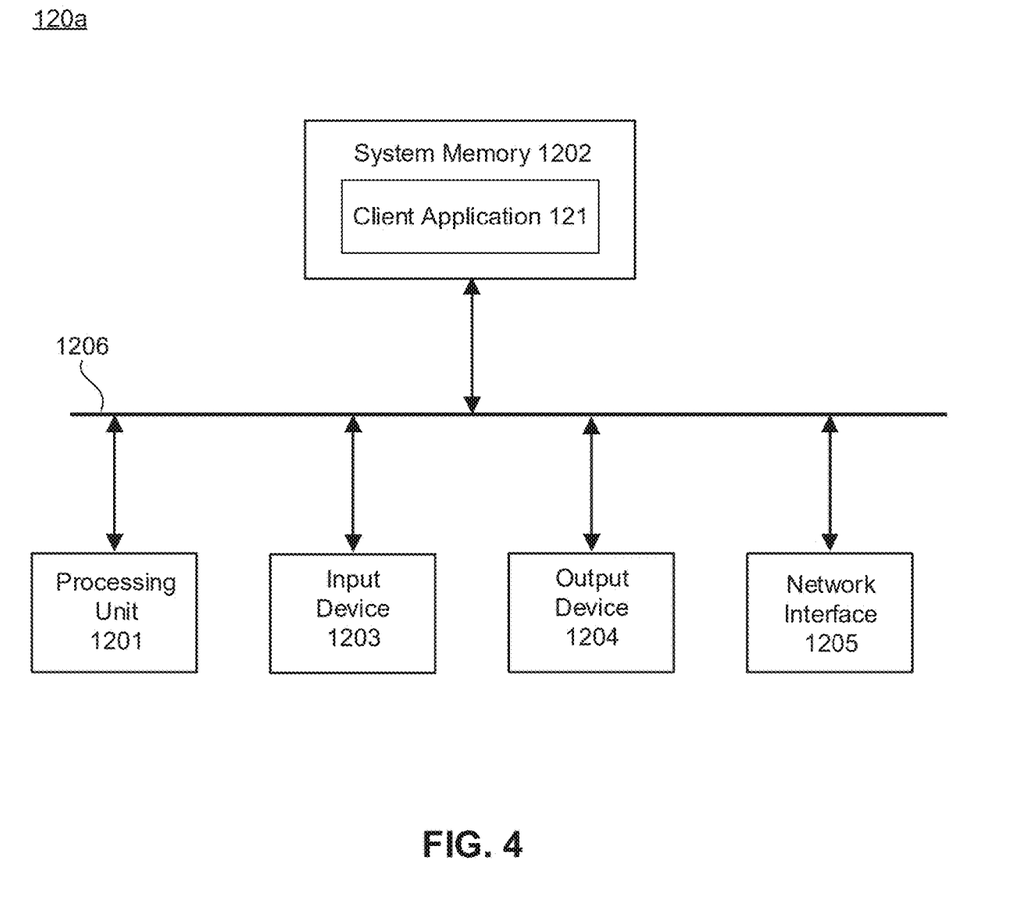
FIG. 4 illustrates an example high level block diagram of a user computing device.

FIG. 4 illustrates an example high level block diagram of a user computing device (e.g., 120a) wherein the present invention may be implemented. The user computing device 120a may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
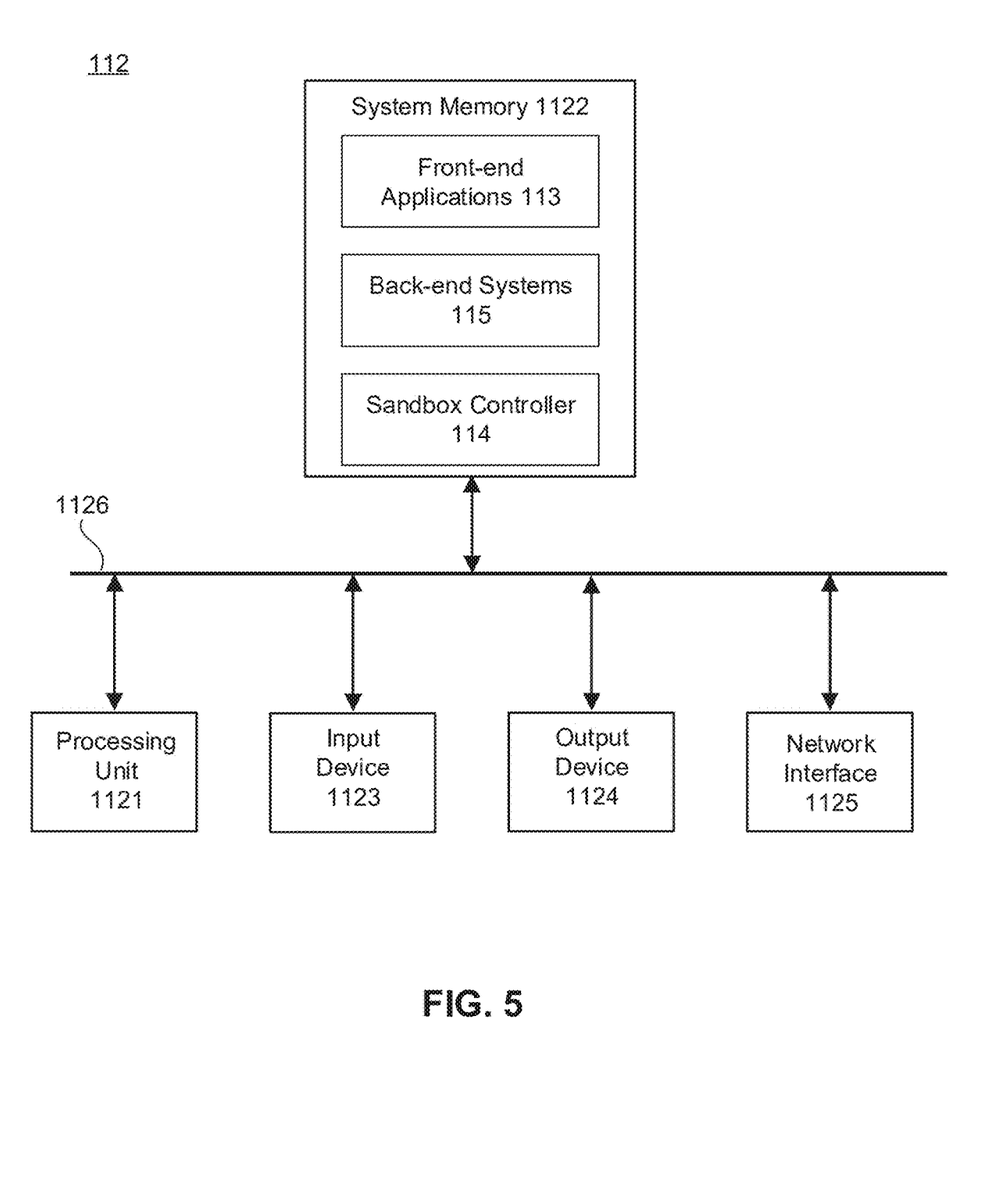
FIG. 5 illustrates an example high level block diagram of the content management server according to one embodiment of the present invention.

FIG. 5 illustrates an example high level block diagram of the content management server 112 according to one embodiment of the present invention. The content management server 112 may be implemented by the computing device 300, and may have a processing unit 1121, a system memory 1122, an input device 1123, an output device 1124, and a network interface 1125, coupled to each other via a system bus 1126. The system memory 1122 may store the front-end applications 113, the back-end systems 115, the sandbox controller 114.

Figure 6A:
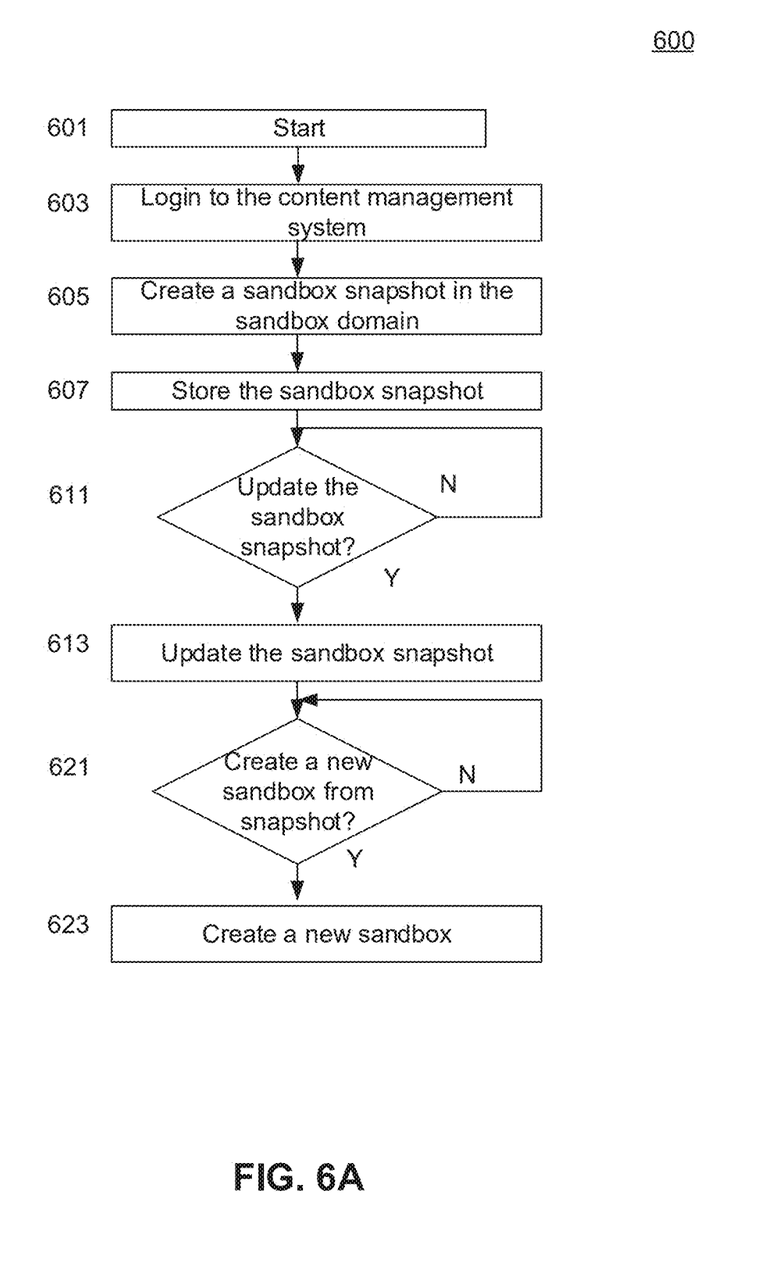
FIGS. 6A and 6B illustrate a flowchart of a method for managing sandboxes in an enterprise content management system according to one embodiment of the present invention.
Figure 6B:
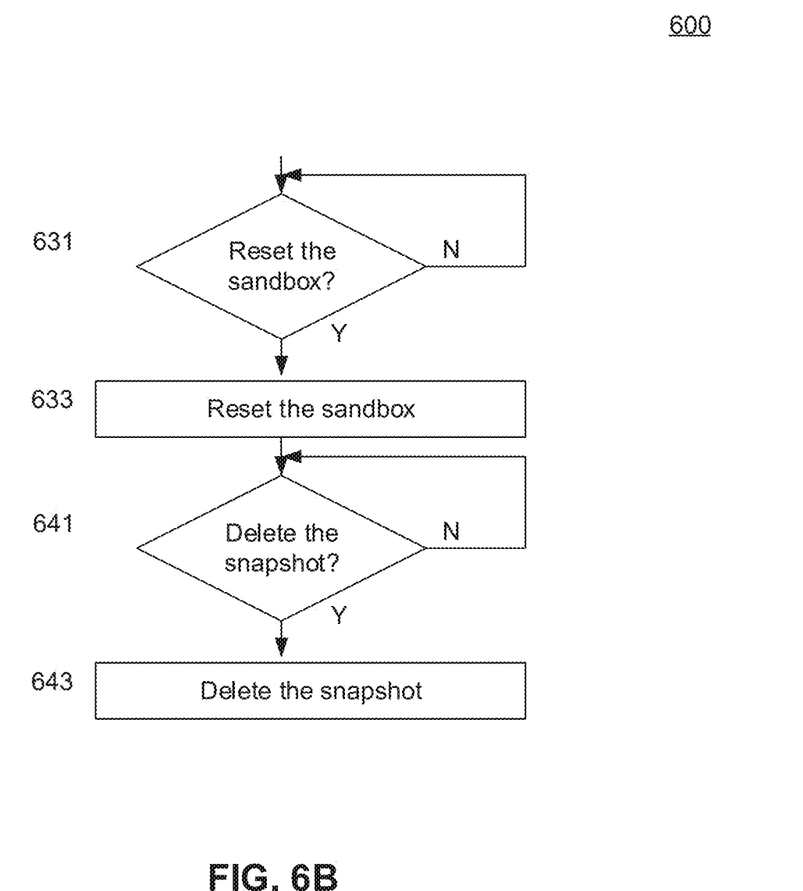

FIGS. 6A and 6B illustrate a flowchart of a method for managing sandboxes in an enterprise content management system according to one embodiment of the present invention. The process may be controlled by the sandbox controller 114, and start at 601.

At 603, a user may login to the content management system 111. The user may be an administrative user, and have access to the production repository 111a and the sandbox repository 111s. The user may be testing some code in the sandbox repository 111s.

In an embodiment for repeatable testing regression, the code may be a current or new version of the configuration of the production repository 111a, and the user may want to test different scenarios that customers can do in the production repository 111*a*. The user may create a snapshot of the original sandbox, make various configuration and data changes to the original sandbox, and go back to the original sandbox with the snapshot of the original sandbox, so that the configuration and data of the sandbox can be reset to what was captured in the snapshot of the original sandbox. In addition, during the testing process, the user may take and store a snapshot of the sandbox at any given time, and refresh the sandbox to go back to its status at that time, including its configuration and data.

The user may create a snapshot of the sandbox 111*s*0 at a first time at 605, and store it in the sandbox repository 111*s* as a sandbox snapshot 111*s*1 at 607. The sandbox snapshot 111*s*1 is stored in the same domain as the sandbox 111*s*0. In one embodiment, the sandbox snapshot 111*s*1 may be a file, which may have both the configuration and data of the sandbox 111*s*0 at the time the snapshot is created. In one embodiment, the sandbox snapshot 111*s*1 is a configuration snapshot, which only stores the configuration of the sandbox 111*s*0 at the time the snapshot is created. In one embodiment, the sandbox snapshot 111*s*1 is a data snapshot, which only stores the data in the sandbox 111*s*0 at the time the snapshot is created, with document metadata, user data and user references of the sandbox 111*s*0 maintained.

In one embodiment, the sandbox snapshot 111*s*1 may be a zip file with a database system in it. In one embodiment, the sandbox snapshot 111*s*1 may be encrypted.

In one embodiment, the sandbox snapshot 111*s*1 is stored in the same sandbox domain as the sandbox 111*s*0. The sandbox domain is separate from the production domain for the production repositories.

Figure 7:
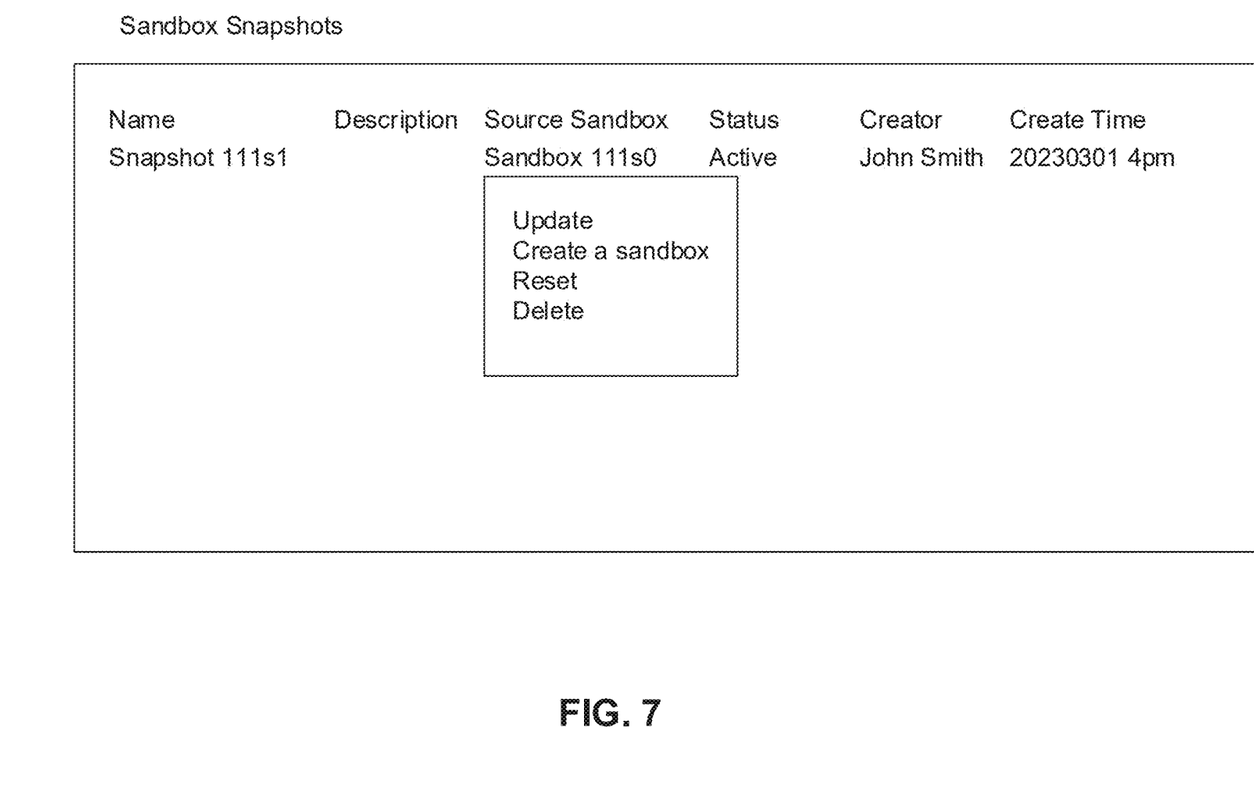
FIG. 7 illustrates an example user interface for managing sandbox snapshots according to one embodiment of the present invention.

FIG. 7 illustrates an example user interface for managing sandbox snapshots according to one embodiment of the present invention. As shown, the user interface 700 may display attributes of one or more sandbox snapshots, including their names, descriptions, source sandboxes, releases, statuses, creators, and create times.

The user may then continue to the testing process for the feature, and make various changes in data and/or configuration. The user may also create and store more sandbox snapshots at different times during the testing process.

The user may also take various actions to manage the sandbox snapshots.

In one example, the user may want to update the sandbox snapshot 111*s*1. In response to a user request at 611, a new snapshot of the sandbox 111*s*0 may be created by the sandbox controller 114 at 613, with the same name and replacing the snapshot 111*s*1.

In one embodiment, the user may want to create a child sandbox with the sandbox snapshot 111*s*1. In response to a user request at 621, the configuration and data in the snapshot may be applied to create a sandbox at 623. If the user chooses to create a sandbox from a sandbox snapshot, one or more sandbox snapshots may be displayed, so that the user may select one.

In one embodiment, the user may want to refresh the sandbox 111*s*0 from the sandbox snapshot 111*s*1 when the testing is done. In response to a user request at 631, configuration and data stored in the sandbox snapshot 111*s*1 may be applied by the sandbox controller 114 at 633, so as to restore the configuration and data of the sandbox 111*s*0 to the first time when the snapshot 111*s*1 was created.

In one embodiment, the user may want to delete a sandbox snapshot. In response to a user request at 641, the sandbox snapshot 111*s*1 may be deleted by the sandbox controller 114 at 643.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for managing one or more sandboxes in a content management system, wherein the content management system comprises a first production repository, and a sandbox controller, the method comprising:
    establishing an access protocol for the production repository, wherein content is stored in the production repository according to the access protocol, and wherein the product repository is in a production domain of the content management system;
    creating a first sandbox by the sandbox controller in the content management system, wherein the first sandbox is in a sandbox domain of the content management system, and wherein the sandbox domain is segregated from the production domain of the content management system;
    creating a first snapshot of the first sandbox at a first time by the sandbox controller, wherein the first snapshot comprises information of the first sandbox at the first time;
    storing the first snapshot of the first sandbox in the sandbox domain of the content management system together with attributes of the first snapshot of the first sandbox, wherein the attributes of the first snapshot of the first sandbox comprise a name, description, and identification information of the first sandbox;
    resetting the first sandbox to its status at the first time by the sandbox controller with the first snapshot of the first sandbox taken at the first time by applying the information of the first sandbox at the first time in the first snapshot of the first sandbox; and
    updating, in response to a user request, the first snapshot by creating a new snapshot of the first sandbox with the same name.

2. The method of claim 1, wherein the first snapshot of the first sandbox is a file, which stores the configuration of the sandbox at the first time when the first snapshot is created.

3. The method of claim 1, wherein the first snapshot of the first sandbox is a file, which stores the data of the first sandbox at the first time when the first snapshot is created, and wherein the data of the first sandbox comprises document metadata, user data and user references maintained in the first sandbox.

4. The method of claim 1, wherein the first snapshot of the first sandbox is a zip file with a database system in it.

5. The method of claim 1, wherein the first snapshot of the first sandbox is an encrypted file.

6. The method of claim 1, further comprising: creating a second snapshot of the first sandbox at a second time, wherein the second snapshot comprises information of the first sandbox at the second time.

7. The method of claim 1, further comprising: creating a second sandbox with the first snapshot by the sandbox controller in response to a user request by applying the information in the first snapshot.

8. The method of claim 1, further comprising: resetting the first sandbox from the first snapshot by the sandbox controller in response to a user request by applying information in the first snapshot.

9. The method of claim 1, further comprising: deleting the first snapshot in response to a user request.

10. A computer-implemented method for managing one or more sandboxes in a content management system, wherein the content management system comprises a first production repository, and a sandbox controller, the method comprising:
    establishing an access protocol for the production repository, wherein content is stored in the production repository according to the access protocol, and wherein the product repository is in a production domain of the content management system;
    creating a first sandbox by the sandbox controller in the content management system, wherein the first sandbox is in a sandbox domain of the content management system, and wherein the sandbox domain is segregated from the production domain of the content management system;
    creating a first snapshot of the first sandbox at a first time by the sandbox controller, wherein the first snapshot comprises information of the first sandbox at the first time and wherein the first snapshot is a zip file with a database system in it;
    storing the first snapshot of the first sandbox in the sandbox domain of the content management system together with attributes of the first snapshot of the first sandbox, wherein the attributes of the first snapshot of the first sandbox comprise a name, description, and identification information of the first sandbox; and
    resetting the first sandbox to its status at the first time by the sandbox controller with the first snapshot of the first sandbox taken at the first time by applying the information of the first sandbox at the first time in the first snapshot of the first sandbox.

11. The method of claim 10, further comprising: creating a second snapshot of the first sandbox at a second time, wherein the second snapshot comprises information of the first sandbox at the second time.

12. The method of claim 10, further comprising: updating the first snapshot in response to a user request by creating a new snapshot of the first sandbox with the same name.

13. The method of claim 10, further comprising: creating a second sandbox with the first snapshot by the sandbox controller in response to a user request by applying the information in the first snapshot.

14. The method of claim 10, further comprising: resetting the first sandbox from the first snapshot by the sandbox controller in response to a user request by applying information in the first snapshot.

15. The method of claim 10, further comprising: deleting the first snapshot in response to a user request.

\* \* \* \* \*